United States Patent Office 2,813,964
Patented Nov. 19, 1957

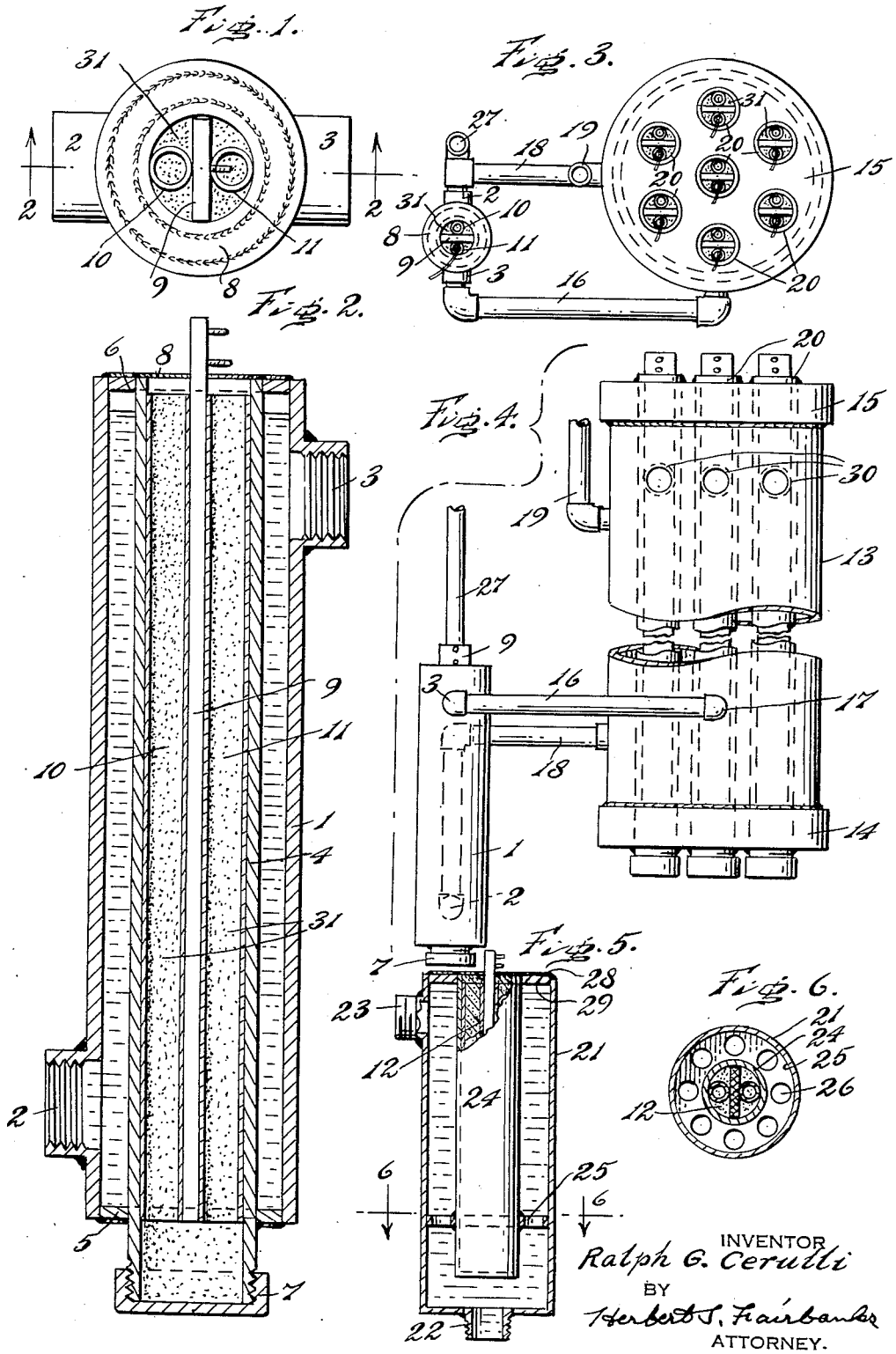

2,813,964

ELECTRIC HOT WATER HOUSE HEATING SYSTEMS AND NOVEL PREHEATERS AND TANKS FOR HOT WATER

Ralph G. Cerulli, Philadelphia, Pa.

Application August 20, 1956, Serial No. 605,160

10 Claims. (Cl. 219—38)

One object of my present invention is to devise a novel preheater which can be used alone for the heating of hot water or in combination with a novel hot water heating tank to form an electric hot water, house heating system.

Another object of the invention is to devise a novel hot water heating tank or boiler and provide for the recirculation of the cooler water in the boiler with the inlet water to the preheater.

A further object of the invention is to devise a novel electric hot water heating system which will be economical to operate with low consumption of electric current and with maximum efficiency in the heating of the water.

Other novel features of construction and advantage will hereinafter appear in the detailed description and the appended claims.

For the purpose of illustrating the invention, I have shown in the accompanying drawings preferred embodiments of it which I have found in practice to give satisfactory and reliable results. It is, however, to be understood that the various instrumentalities of which the invention consists can be variously arranged and organized, and the invention is not limited, except by the scope of the appended claims, to the exact arrangement and organization of these instrumentalities as herein set forth.

Figure 1 is a top plan view of a preheater embodying my invention.

Figure 2 is a sectional elevation taken on line 2—2 of Figure 1.

Figure 3 is a top plan view of the combined preheater and tank or boiler.

Figure 4 is a side elevation, partly broken away, of the combined preheater and boiler or tank.

Figure 5 is a side elevation, partly broken away, of another embodiment of preheater embodying my invention.

Fig. 6 is a section on line 6—6 of Fig. 5.

Similar numerals of reference indicate corresponding parts.

Referring to the drawings:

The preheater shown in Figures 1 to 4 inclusive has an outer cylinder 1 provided with an inlet 2 and an outlet 3. An inner cylinder 4 extends through the outer cylinder centrally thereof. A bottom ring 5 and a top ring 6 are welded to the outer and inner cylinders to form a water receiving space between them. The inner cylinder extends below the outer cylinder and has a threaded cap 7. A top sealing ring 8 may be employed if desired and is welded to the upper ends of the outer and inner cylinders.

An electric heating element 9 of any desired or conventional construction extends centrally within the inner cylinder and above the cylinders with terminals for connection with a source of electric supply. I provide a plurality of heat conducting tubes 10 and 11, preferably of copper, or other suitable heat conducting material, which contact the heating element 9 and the inner wall of the inner cylinder. In the drawings, I have shown two tubes located at opposite sides of the heating element which latter is rectangular in cross section. In some cases, the tubes 10 and 11 may be filled to a desired extent with heat conducting material 12, see Figure 5. In Figures 1 to 4 inclusive the tubes 10 and 11 are open at their tops and bottoms.

As shown in Figures 3 and 4, the preheater can be connected with a boiler or tank 13 having a bottom closure 14 and a top closure 15 welded thereto. The hot water outlet 3 is connected with the boiler 13 by a pipe 16 at 17, and a pipe 18 leads from the lower portion of the boiler 13 to the inlet of the preheater. The boiler 13 has an outlet 19 leading to a point of utilization of the hot water, such as for example the radiators of a heating system for a house.

Electric heating units extend through the top and bottom closures of the boiler and are of the same construction and operation as those described in connection with the preheater, having a cylinder with heat conducting tubes and electric heating element.

In the embodiment seen in Figures 5 and 6, an outer cylinder 21 of a preheater has a bottom inlet 22 and an upper outlet 23. An inner cylinder assembly 24, corresponding to the inner cylinder 4, heating element 3 and tubes 10 and 11, is welded to a disc 25 having spaced openings 26 and having a slip fit in the cylinder 21. The bottom of the cylinder assembly 24 is closed and within the water chamber. A weld 28 secures a top ring 29 to the outer cylinder and the inner cylinder.

Any desired number of preheaters can be employed and they would preferably be connected in series and as a unit can be used independently of or in connection with a tank or boiler, and in some cases the electric heating units in the boiler can be omitted and the boiler serve as a storage tank.

A return pipe 27 leads from the radiators to the inlet of the preheater as shown in Figure 4.

The boiler 13 has threaded openings 30 for the insertion of automatic, temperature limit controls which are connected with the electric heating elements and which are of conventional construction and operation.

I have found after a long period of experimentation that materially better results can be obtained if the spaces between the heating element tubes and inner cylinder as well as the tubes are filled with heat conducting material, as shown at 31 in Figures 1 to 4 inclusive or 12 as shown in Figures 5 and 6.

The upper end of the inner cylinder may be provided with a removable seal, if desired.

The construction and arrangement is such that the electric heating element can be withdrawn for inspection or replacement without draining the system.

It will be readily apparent that while I have referred herein to the heating of water the invention can be employed for the heating of any desired fluid.

Having thus described my invention, what I claim as new and desire to secure by Letters Patent is:

1. A preheater comprising an outer cylinder having an inlet and an outlet, an inner cylinder within the outer cylinder and spaced therefrom to form a water chamber, an elongated, electric heating element within the inner cylinder and extending along its longitudinal axis, and heat conducting tubes at opposite sides of the element and contacting the heating element and the inner wall of the inner cylinder.

2. The construction defined in claim 1, wherein the tubes are open at their ends.

3. The construction defined in claim 1, wherein the heating element is rectangular in cross section and the heat conducting tubes consist of two tubes located at opposite sides of the heating element and in contact with it and with the inner wall of the outer cylinder.

4. The construction defined in claim 1, wherein the inner cylinder extends outwardly beyond the outer cylinder with a removable closure.

5. The construction defined in claim 1, wherein the tubes are open at one end and the inner cylinder at the opposite end terminates within the water chamber with a closed end.

6. The construction defined in claim 1, wherein the tubes contain heat conducting material.

7. The construction defined in claim 1, wherein the inner cylinder is open at one end and closed at is other end.

8. The construction defined in claim 1, wherein the inner cylinder has a closed end within the water chamber and an apertured disc spaced the inner cylinder from the outer cylinder.

9. The construction defined in claim 1, wherein there are spaces between the inner cylinder, heating element and tubes, and heat conducting material filling said spaces.

10. The construction defined in claim 1, wherein the heating element is rectangular in cross section with the tubes on opposite sides thereof providing spaces between them and the inner cylinder, and heat conducting material filling said spaces and said tubes.

References Cited in the file of this patent
UNITED STATES PATENTS

| | | |
|---|---|---|
| 1,215,703 | Poole | Feb. 13, 1917 |
| 1,258,642 | Bergeron | Mar. 12, 1918 |
| 1,408,502 | Hadaway | Mar. 7, 1922 |
| 1,640,049 | Nesmith | Aug. 23, 1927 |
| 1,661,693 | Ewart | Mar. 6, 1928 |
| 1,692,741 | Hurst | Nov. 20, 1928 |
| 1,696,758 | Galdi et al. | Dec. 25, 1928 |